May 30, 1961  H. J. EICHEL  2,986,477
ADHESIVE TAPE
Filed June 19, 1958
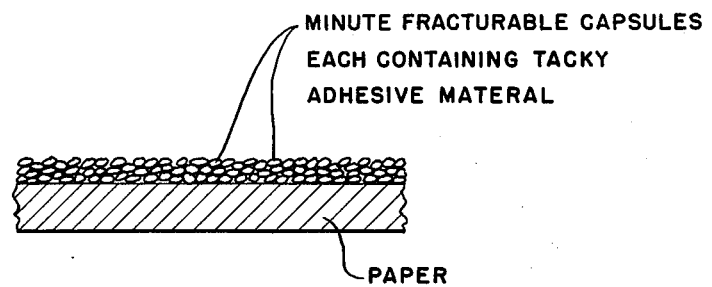
INVENTOR
HERMAN J. EICHEL
BY
HIS ATTORNEYS

# United States Patent Office 2,986,477
Patented May 30, 1961

2,986,477
ADHESIVE TAPE

Herman J. Eichel, Dayton, Ohio, assignor to The National Cash Register Company, Dayton, Ohio, a corporation of Maryland Filed June 19, 1958, Ser. No. 742,990
1 Claim. (Cl. 117—122)

This invention relates to an adhesive tape, and more particularly pertains to such having a potentially adhesive coating on a surface thereof, which coating includes a profusion of non-tacky microscopic fracturable capsules each containing a nucleus of a tacky adhesive which may be exposed for making the tape affixable to a receiving material by pressure.

The tape includes a base web such as paper or other fibrous felted material, artificial films cast from film-forming substances such as degenerated cellulose, cellulose acetate, and the like, or of woven fibers such as cotton, linen, or nylon cloth.

The accompanying drawing illustrates the invention.

The coating is applied thereto, on the potentially adhesive surface or surfaces, as a wet but dryable slurry containing, in suspension, the fracturable capsules which contain the tacky adhesive material.

The capsules may be made by dissolving tacky adhesive materials in an evaporable solvent to form a water-immiscible solution which is emulsified into an aqueous sol of hydrophilic film-forming material. The liquid droplets of the emulsion are encased by causing coacervate deposition of the film-forming material around each droplet of the emulsion. The film-forming material is caused to solidify and harden around the droplets, and the solvent in the nuclei permitted to escape, leaving the capsules dispersed in a residual aqueous medium from which sufficient water is extracted to form a coatable slurry, which slurry is applied to the web, and dried.

To make the adhesive solution, the adhesive contents of which will become the nuclei of the fracturable capsules, 18 parts, by weight, of isobutylene polymer (having an average molecular weight of 64,000–81,000); 9 parts, by weight, of dihydro abietyl phthalate and 13 parts, by weight, of polybutene (having an average molecular weight of 940), is dissolved at room temperature in 60 parts, by weight, of petroleum distillate having a main boiling point of 175 degrees Fahrenheit. This adhesive-containing solution is emulsified in 100 parts, by weight, of a 5 percent aqueous solution of pigskin gelatin having its iso-electric point at pH 8. To the emulsion is added 100 parts, by weight, of a 5 percent aqueous sol of gum arabic, and the mixture is stirred and adjusted to a pH of 9 with a 5 percent aqueous solution of sodium hydroxide. The mixture is diluted to 2 liters with water and, thereafter, the pH is lowered with a 15 percent aqueous solution of acetic acid to induce coacervation which results in the deposition of walls of a complex of gelatin and gum arabic, individually around each droplet. The making of the gelatin emulsion, the gum arabic sol, their mixture, and coacervation is carried on at a temperature above the gellation point of the gelatin, preferably at 113 degrees Fahrenheit. The coacervated mixture, while still being stirred, is cooled to 50 degrees Fahrenheit, to gel the capsule walls to a solid. Five grams of a 5 percent aqueous solution of glutaraldehyde is added to the gelled capsule dispersion and stirred for a few hours to harden the capsules. During the time the capsules are being formed the solvent evaporates leaving the residual adhesive as tacky nuclei surrounded by fracturable solid and non-tacky walls.

The residual water of the dispersion of capsules may be reduced by extraction to a point where it makes a coating of the right viscosity for application to the web.

The coating is applied to the web, to the desired thickness, and dried, whereupon the tape is ready for use.

To fracture the capsules in preparing the tape for affixation, they may be abraded by rubbing with sharp grit or a sharp blade, or by pressure applied by calender rolls.

The novel tape may be roughly handled or turned into tight rolls without destroying its adhesive characteristics or sticking to itself.

What is claimed is:

An adhesive tape including a base web on a surface of which is coated a profusion of microscopic capsules each having a central nucleus of a tacky adhesive surrounded by a non-tacky wall, the walls of the capsules being fracturable to release the tacky adhesive nuclei so the tape may be affixed to a tape-receiving material, said adhesive being a mixture of approximately 18 parts, by weight, of isobutylene polymer, having an average molecular weight of 64,000–81,000; and 13 parts, by weight, of polybutene having an average molecular weight of 940.

References Cited in the file of this patent
UNITED STATES PATENTS

| | | |
|---|---|---|
| 1,769,627 | Fischer | July 1, 1930 |
| 1,954,219 | Moyses | Apr. 10, 1934 |
| 2,349,508 | Mack | May 23, 1944 |
| 2,708,192 | Joesting et al. | May 10, 1955 |
| 2,730,456 | Green et al. | Jan. 10, 1956 |
| 2,800,457 | Green et al. | July 23, 1957 |
| 2,808,352 | Coleman et al. | Oct. 1, 1957 |
| 2,907,682 | Eichel | Oct. 6, 1959 |

FOREIGN PATENTS

| | | |
|---|---|---|
| 456,471 | Great Britain | Nov. 10, 1936 |
| 571,322 | Great Britain | Aug. 20, 1945 |